United States Patent
Hwang

Patent Number: 5,943,450
Date of Patent: Aug. 24, 1999

[54] APPARATUS AND METHOD FOR COMPENSATING FOR CAMERA VIBRATION DURING VIDEO PHOTOGRAPHY

[75] Inventor: Jung-hyun Hwang, Seoul, Rep. of Korea

[73] Assignee: Samsung Electronics Co., Ltd., Suwon, Rep. of Korea

[21] Appl. No.: 08/976,454

[22] Filed: Nov. 25, 1997

[30] Foreign Application Priority Data

Nov. 27, 1996 [KR] Rep. of Korea .................. 96-58503

[51] Int. Cl.$^6$ ............................................. G06K 9/32
[52] U.S. Cl. ................................................. 382/298; 396/52
[58] Field of Search ..................................... 382/236, 276, 382/255, 107, 298; 348/352; 396/52, 55

[56] References Cited

U.S. PATENT DOCUMENTS

| | | | |
|---|---|---|---|
| 5,727,115 | 3/1998 | Wada ..................................... | 386/113 |
| 5,771,407 | 6/1998 | Imafuji et al. ......................... | 396/55 |
| 5,790,901 | 8/1998 | Nakayama et al. .................... | 396/82 |
| 5,870,634 | 2/1999 | Sugaya et al. ......................... | 396/52 |

*Primary Examiner*—Yon J. Couso
*Attorney, Agent, or Firm*—Jones Volentine, LLP

[57] ABSTRACT

An apparatus for compensating for the motion of an image due to vibrations of a camera during video photography. A first motion detecting part extracts first directional information for an entire image area and detects a first directional motion component over a designated time period. A second motion detecting part extracts and magnifies second directional information for a partial image area and detects a second directional motion component over the designated period. A difference value calculating part inputs the first directional motion component and the second directional motion component and calculates a directional difference value indicative of the absolute value of the difference between the first directional motion component and the second directional motion component multiplied by a reciprocal of a magnification ratio. A compensating part selects the first directional motion component multiplied by the magnification ratio to compensate for the vibration when the directional difference value is greater than one. The compensating part selects the second directional motion component to compensate for the vibration when the directional difference value is less than or equal to one. The motions due to hand shaking during video photography are therefore correctly and stably compensated for.

11 Claims, 4 Drawing Sheets

APPARATUS AND METHOD FOR COMPENSATING FOR CAMERA VIBRATION DURING VIDEO PHOTOGRAPHY

BACKGROUND OF THE INVENTION

1. Field of the Invention

The present invention relates to a camcorder, and more particularly, to a motion compensating apparatus and method for stabilizing vibrations due to an operator's shaking hands during video photography.

2. Description of the Related Art

The ability to detect a motion vector from a moving picture signal is a basic requirement for picture compression, picture recognition and picture stability. In particular, when an image is photographed using a VCR-incorporated camera (hereinafter, a camcorder) while walking or riding in a vehicle, for example, an unstable image is likely to be input to the camcorder due to camera vibration caused by the operator's shaking hands. This instability or vibration is an even greater factor when photographing at increased magnification, such as when conducting video photography using a zoom feature.

Thus, in order to correctly compensate for the vibration due to hand shaking, the motion vectors should be detected at the subpixel level as well as at the pixel level. However, such a detection scheme increases the number of operations required and also requires that a complicated interpolating circuit be incorporated in the camcorder. Further, as the picture magnification increases, the probability also increases that stray motion information will be detected which is unrelated to the hand shaking.

A conventional method for compensating for hand shaking motion will be described with reference to FIG. 1 and FIG. 2.

In the motion vector detecting method shown in FIG. 1, image formation for an entire image or a partial image of a picture is input in step 10. In step 12, the most recently inputted image formation is compared with image information that was previously inputted, either by field or frame, to detect horizontal and vertical motion vectors to be optimized. When the motion vectors are detected using the information for the entire image, an abundance of pattern information within the image can be used in an attempt to correctly detect the horizontal and vertical motion vectors. However, there is a limit to resolving the components of the motion, especially when using partial image information.

In step 14, an image in a field memory is compensated using the detected horizontal and vertical motion vectors. Thereafter, the image is enlarged by a predetermined magnification ratio in step 16.

While the motion compensating method shown in FIG. 1 can stably compensate for the motion in most cases, it cannot always correctly detect the specific motion vectors to be compensated, thereby resulting in erroneous motion compensation.

FIG. 2 illustrates another conventional motion compensating method. As before, the entire or partial image information of a picture is first input in step 20. In step 22, the input image is electronically magnified in order to more accurately detect the motion components of the image. In step 24, the horizontal and vertical motion vectors $V_x$ and $V_y$ of the magnified image are detected through the following formulas (1) and (2):

$$V_x = \min_i \{Corr_x(i)\} \quad (1)$$

where, $$Corr_x(i) = \sum_{x=0}^{w-1} |P_x^{n-1}(x) - P_x^n(x+i)|$$

$$V_y = \min_j \{Corr_y(j)\} \quad (2)$$

where, $$Corr_y(j) = \sum_{y=0}^{H-1} |P_y^{n-1}(y) - P_y^n(y+j)|$$

In the above formulas (1) and (2) 'P' is a value obtained by projecting a luminance component of an image in the first dimension, which represents the first dimensional pattern information of the image; 'Corr' denotes a correlation value between a current projection value '$P^n$' and a past projection value '$P^{n-1}$'; 'W' and 'H' denote a width and a height of the image, respectively; 'x' denotes a pixel in a horizontal direction; and 'y' denotes a pixel in a vertical direction.

The amount of optimized motion of an image is estimated to the horizontal and vertical positions where the correlation value is the minimum. At this time, the unit of the output motion vector is an integer value. In order to realize a more accurate motion vector, the correlation value is interpolated to find the most optimized (minimum) value at the pixel level. Likewise, at the subpixel level, the values '$P^n$' and '$P^{n-1}$' are interpolated to find the most optimized correlation value.

In step 26, after the horizontal and vertical motion vectors $V_x$ and $V_y$ are detected, an image in a field memory is compensated using these vectors.

Note that in step 22, the amount of extracted and magnified image motion information should be sufficiently large in order to correctly detect the motion vectors at the subpixel level. However, since the motion information of the image is inversely proportional to the magnification ratio of the electrically magnified image, there is a limit to securing stability of the motion vectors. In particular, when many independent motions exist at the magnified portion of the image, the motions of an object in the image are compensated, but the image motions due to the hand shaking are not. Therefore, the target for stability frequently changes between the entire image and the object in the image, thereby greatly lowering the stability of the image.

SUMMARY OF THE INVENTION

The present invention provides a motion compensating apparatus and method for video photography applications which compensates for image motions due to hand shaking by selecting motion vectors detected from directional information for an entire image area and directional information for a partial magnified image area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, the present invention provides an apparatus for compensating for the motion of an image due to vibrations of a camera during video photography, the apparatus comprising: a first motion detecting part for extracting first directional information for an entire image area and detecting a first directional motion component over a designated time period; a second motion detecting part for extracting and then magnifying second directional information for a partial image area and detecting a second directional motion component over the designated period; a difference value calculating part for inputting the first directional motion component and the second directional motion component and calculating a directional difference value indicative of the absolute value of the difference between the first directional motion component and the second directional motion component multiplied by a reciprocal of a magnification ratio; and a compensating part for compensating the vibration using the first directional motion component multiplied by the magnification ratio when the directional difference value is greater than one, and for compensating the vibration using the second directional motion component when the directional difference value is less than or equal to one.

In another aspect, the present invention provides for a method of compensating for the motion of an image due to vibration of a camera during video photography, the method comprising the steps of: (a) inputting an entire image and a partial image into the camera; (b) extracting first directional information for the entire image area and detecting a first directional motion component over a designated time period; (c) extracting and magnifying second directional information for the partial image area and detecting a second directional motion component over the designated period; (d) inputting the first directional motion component and the second directional motion component into a difference value calculating part; (e) calculating a directional difference value indicative of the absolute value of the difference between the first directional motion component and the second directional motion component multiplied by a reciprocal of a magnification ratio; (f) compensating for the vibration using the first directional motion component multiplied by the magnification ratio when the directional difference value is greater than one; and (g) compensating for the vibration using the second directional motion component when the directional difference value is less than or equal to one.

The designated time period is defined as the time between input of current image information and image information inputted just prior to the current image information.

BRIEF DESCRIPTION OF THE DRAWINGS

The above objects and advantages of the present invention will be described in detail with reference to the attached drawings, in which.

DETAILED DESCRIPTION OF THE PREFERRED EMBODIMENT

Figure 1:
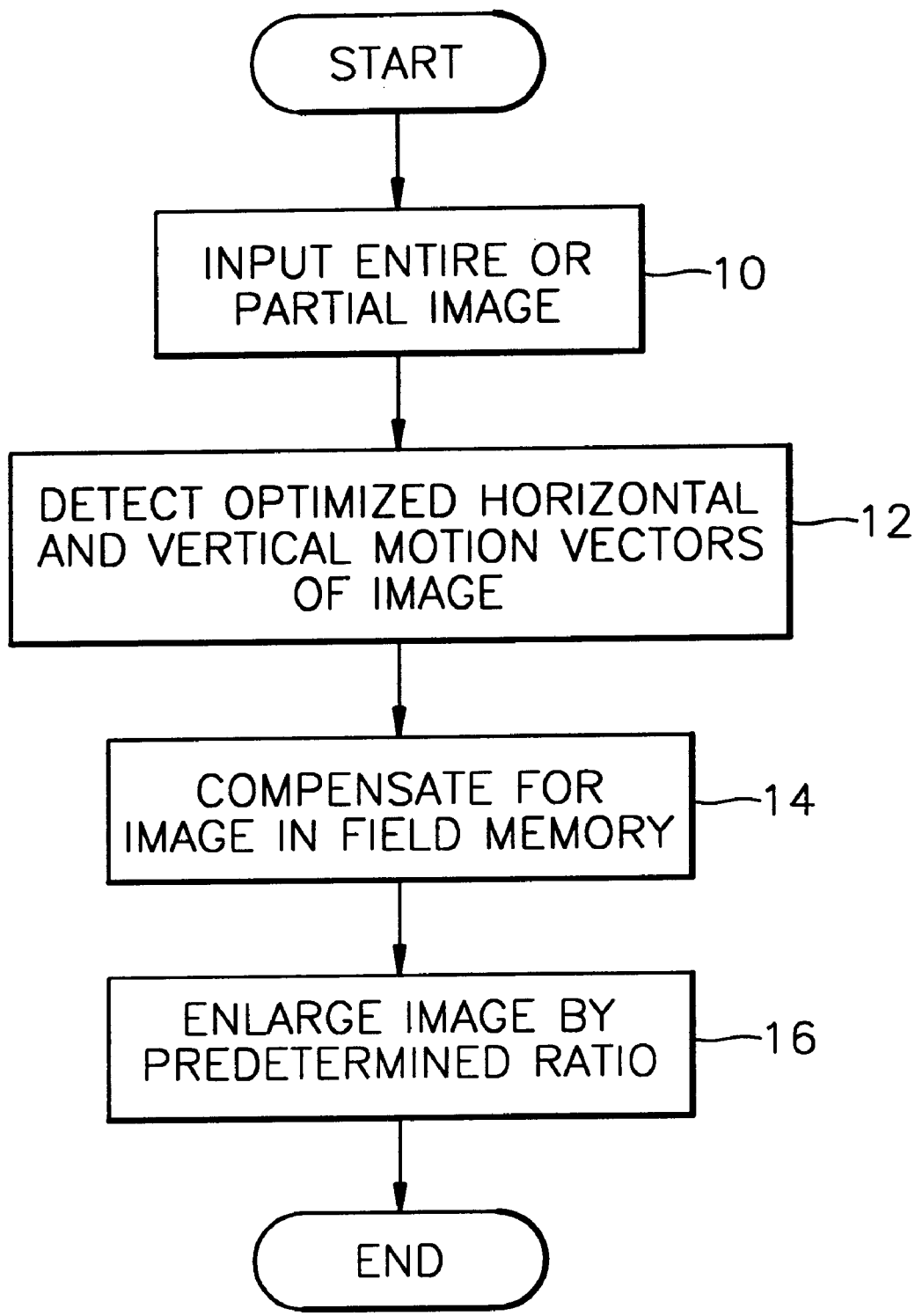
FIG. 1 is a flowchart for illustrating a conventional motion compensation method.
Figure 2:
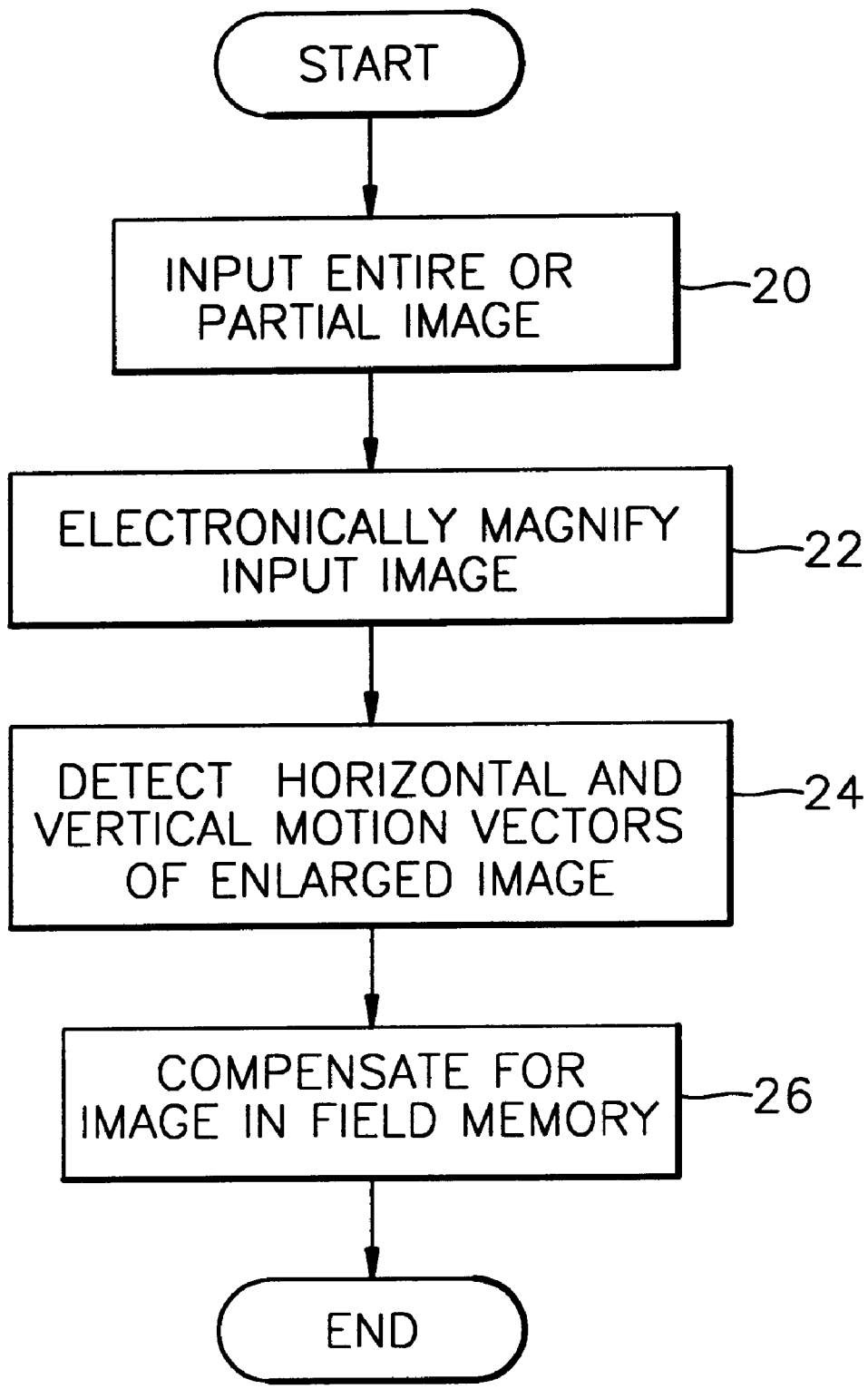
FIG. 2 is a flowchart for illustrating another conventional motion compensating method.
Figure 3:
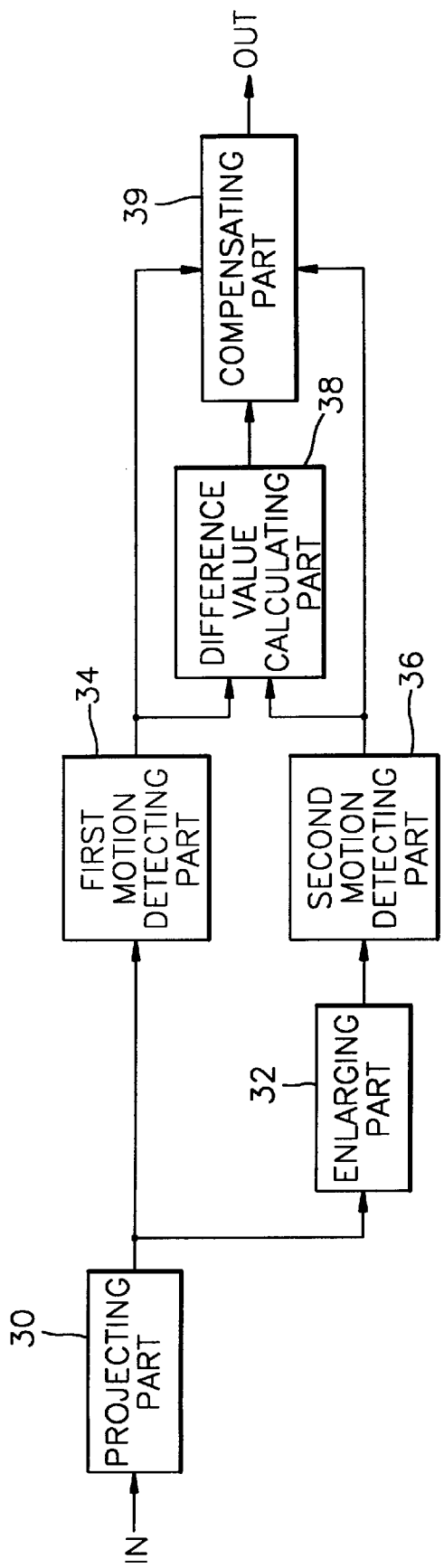
FIG. 3 is a block diagram of a motion compensating apparatus according to the present invention.

Referring to FIG. 3, the motion compensation apparatus according to the present invention generally includes a projecting part 30, an enlarging part 32, a first motion detecting part 34, a second motion detecting part 36, a difference value calculating part 38, and a compensating part 39.

Figure 4:
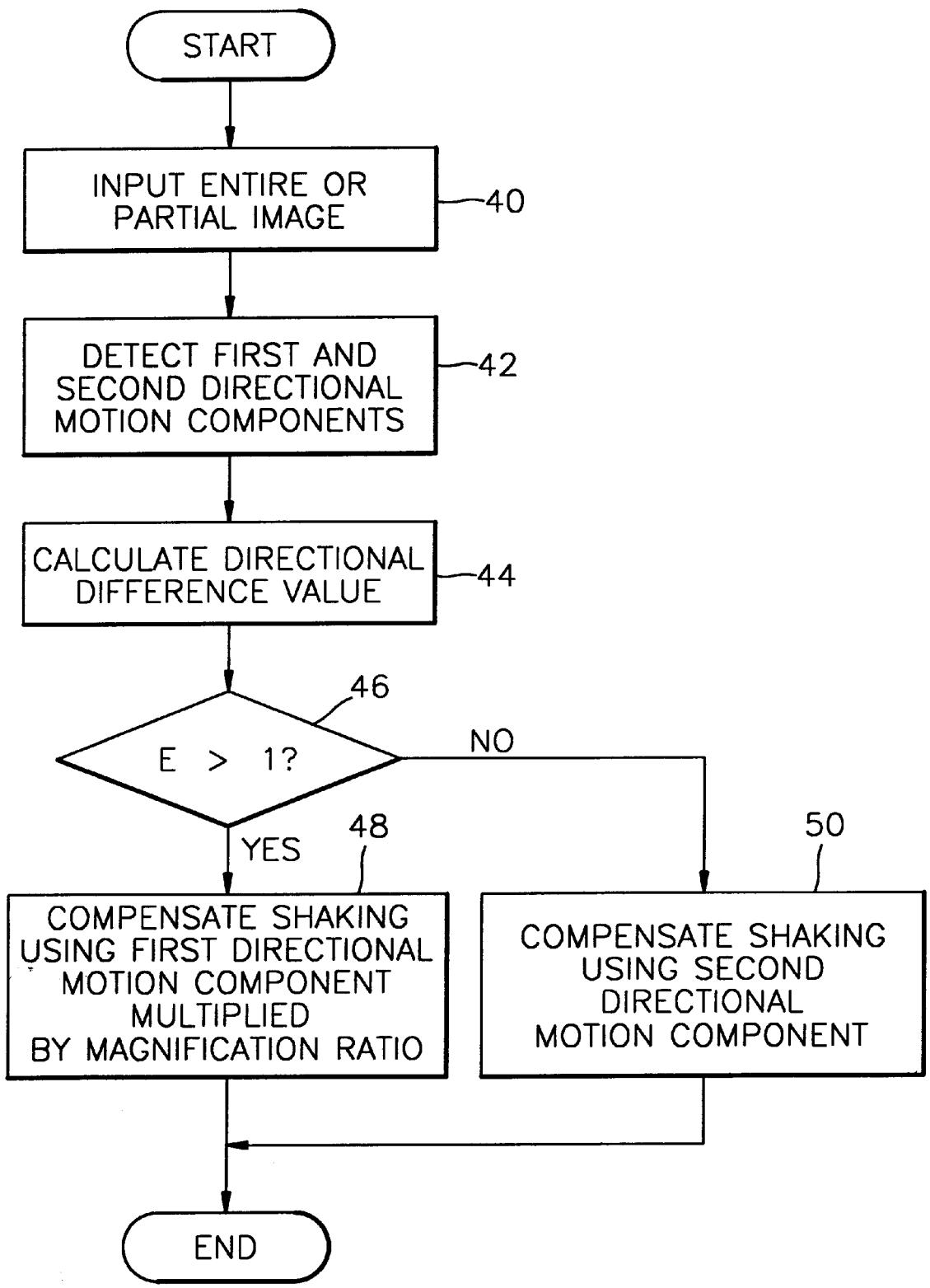
FIG. 4 is a flowchart for illustrating a motion compensating method, according to the present invention, which is performed in the apparatus shown in FIG. 3.

Referring to FIG. 4, the compensating method according to the present invention using the apparatus of FIG. 3, generally includes steps 40 to 44 for calculating a directional difference value using a first directional motion component and a second directional motion component obtained from an input image. Steps 46 to 50 compensate for the hand shaking in accordance with the calculated directional difference values.

The apparatus and method will be described below in greater detail with reference to the apparatus depicted in FIG. 3 and the method depicted in FIG. 4.

First, in step 40, image information for a picture, photographed by a camcorder for example, is inputted through an input terminal (IN). The image information may comprise the entire image or a partial image.

In step 42, the first directional motion component and the second directional motion component are obtained from the input image. Each of the first directional motion component and the second directional motion component are comprised of horizontal and vertical motion vectors. More specifically, in step 42, the projecting part 30 projects the entire image input though the input terminal (IN) in horizontal and vertical directions, to thereby extract first directional information (or first feature information) for the entire area, i.e., first horizontal and vertical information $P_x$ and $P_y$. The first motion detecting part 34 detects the first directional motion component for a designated time period, defined by the time period between the most recently inputted image information (current information) and the image information inputted just prior to the current information (past information). In other words, in the first motion detecting part 34, a correlation value for the designated time period is substituted in formulas (1) and (2), to thereby detect first directional motion vectors, i.e., first horizontal and vertical motion vectors $V_x$ and $V_y$.

Also, the projecting part 30 inputs a partial image through the input terminal (IN) and projects the input image in horizontal and vertical directions, to thereby extract second directional information (or second feature information) for the partial area, i.e., second horizontal and vertical information $R_x$ and $R_y$. The enlarging part 32 spatially enlarges or magnifies the second directional information by a predetermined magnification ratio 'K', and outputs the magnified information to the second motion detecting part 36. The second motion detecting part 36 detects the second directional motion component for the time period between the current and past information. In other words, in the second motion detecting part 36, a correlation value for the designated time period is substituted in the following formulas (3) and (4) to thus detect second directional motion vectors, i.e., second horizontal and vertical motion vectors $U_x$ and $U_y$ $$U_x = \min_i \{Corr_x(i)\} \quad (3)$$

where, $$Corr_x(i) = \sum_{x=0}^{w-1} | R_x^{n-1}(x) - R_x^n(x+i) |$$

$$U_y = \min_j \{Corr_y(j)\} \quad (4)$$

where, $$Corr_y(j) = \sum_{y=0}^{H-1} | R_y^{n-1}(y) - R_y^n(y+j) |$$

In the above formulas (3) and (4), $R_x$ and $R_y$ are the values obtained by magnifying the projection value by the predetermined magnification ratio K, and is output as an integer value. The second directional motion vectors $U_x$ and $U_y$ of the image are then divided by K so that motions at the subpixel level can be correctly detected.

Note that in FIG. 3, the magnifying and extracting steps may be conducted in either order. That is, the second directional information could be extracted and then magnified, or the second directional information could be magnified and then extracted.

Since the motion component represents a magnified object area, there may be a large difference between the actual motion component and the result detected from the magnified area if independent motions exist in the entire image. Also, as magnification is increased, the field of view of the projected image information is reduced, and the greater the probability that errors exist in the detected result. That is, in a magnified area, motion is more easily detected or identified, but the reliability of the motions as accurately representing the horizontal and vertical components due to hand shaking is deteriorated. Therefore, the detected motions must be properly estimated to thereby correctly compensate for the horizontal and vertical motions.

Accordingly, in step 44, the difference value calculating part 38 of FIG. 3 obtains the absolute values of directional difference values E, i.e., horizontal and vertical difference values $E_x$ and $E_y$, through the following formulas (5) and (6):

$$E_x = |V_x - (U_x \cdot K^{-1})| \qquad (5)$$

$$E_y = |V_y - (U_y \cdot K^{-1})| \qquad (6)$$

If the estimated difference between the motions is large, the reliability of the second directional motion vectors $U_x$ and $U_y$ in the magnified area is lowered with respect to the first directional motion vectors $V_x$ and $V_y$ of the entire image, for the above-described reasons.

In step 46, the horizontal and vertical difference values $E_x$ and $E_y$ as calculated by the difference value calculating part 38 are input into the compensating part 39 for selecting the first or second directional motion components based on the magnitude of the inputted values.

If the input values are greater than '1', in step 48, the first directional motion component, comprising the first horizontal and vertical motion vectors, is selected and the image motions due to the hand shaking are compensated using these selected motion vectors $V_x$, $V_y$ multiplied by the magnification ratio K. The typical value for K is in the range of 2 to 4.

However, if the input values are less than or equal to '1', in step 50, the second directional motion component, comprising the second horizontal and vertical motion vectors, is selected and the image motions due to the hand shaking are compensated using the selected motion vectors $U_x$, $U_y$.

Therefore, to calculate a correlation value, the current and past projection or image values, the horizontal and vertical motion components, and the entire area or partial area values must be detected or determined. Also, the input image is completely scanned and stored in a field memory, and then compensated using the detected motion components as described above.

Accordingly, in the apparatus and method for compensating motion according to the present invention, the motions due to an operator's shaking hands during video photography are correctly and stably compensated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for compensating for the motion of an image due to vibrations of a camera during video photography, said apparatus comprising:

first motion detecting part for extracting first directional information for an entire image area and detecting a first directional motion component over a designated time period;

second motion detecting part for extracting and then magnifying second directional information for a partial image area and detecting a second directional motion component over the designated period;

difference value calculating part for inputting said first directional motion component and said second directional motion component and calculating a directional difference value indicative of the absolute value of the difference between said first directional motion component and said second directional motion component multiplied by a reciprocal of a magnification ratio; and compensating part for compensating said vibration using said first directional motion component multiplied by the magnification ratio when said directional difference value is greater than one, and for compensating said vibration using said second directional motion component when said directional difference value is less than or equal to one.

2. The apparatus as claimed in claim 1, wherein said designated time period is defined as the time between input of current image information and image information inputted just prior to said current image information.

3. The apparatus as claimed in claim 2, said first motion detecting part comprising:

first projecting means for extracting said first directional information by projecting said entire image area in horizontal and vertical directions; and first motion component detecting means for detecting said first directional motion component over said designated time period.

4. The apparatus as claimed in claim 3, said second motion detecting part comprising:

second projecting means for extracting said second directional information by projecting said partial image area in horizontal and vertical directions;

enlarging means for magnifying said extracted second directional information by the magnification ratio and outputting the magnified information; and second motion component detecting means for detecting said second directional motion component over said designated time period.

5. The apparatus as claimed in claim 4, wherein said magnification ratio is in a range from 2 to 4.

6. An apparatus for compensating for the motion of an image due to vibrations of a camera during video photography, said apparatus comprising:

first motion detecting part for extracting first directional information for an entire image area and detecting a first directional motion component over a designated time period;

second motion detecting part for extracting second directional information for a magnified image area and detecting a second directional motion component over the designated period;

difference value calculating part for inputting said first directional motion component and said second directional motion component and calculating a directional difference value indicative of the absolute value of the difference between said first directional motion component and said second directional motion component multiplied by a reciprocal of a magnification ratio; and compensating part for compensating said vibration using said first directional motion component multiplied by the magnification ratio when said directional difference value is greater than one, and for compensating said vibration using said second directional motion component when said directional difference value is less than or equal to one.

7. A method for compensating for the motion of an image due to vibration of a camera during video photography, said method comprising the steps of:

(a) inputting an entire image and a partial image into said camera;

(b) extracting first directional information for the entire image area and detecting a first directional motion component over a designated time period;

(c) extracting and magnifying second directional information for the partial image area and detecting a second directional motion component over the designated period;

(d) inputting said first directional motion component and said second directional motion component into a difference value calculating part;

(e) calculating a directional difference value indicative of the absolute value of the difference between said first directional motion component and said second directional motion component multiplied by a reciprocal of a magnification ratio;

(f) compensating for said vibration using said first directional motion component multiplied by the magnification ratio when said directional difference value is greater than one; and (g) compensating for said vibration using said second directional motion component when said directional difference value is less than or equal to one.

8. The method as claimed in claim 7, wherein during said extracting step (b) and said extracting and magnifying step (c), said designated time period is defined as the time between input of current image information and image information inputted just prior to said current image information.

9. The method as claimed in claim 8, wherein said magnification ratio is in a range from 2 to 4.

10. The method as claimed in claim 7, wherein during said extracting and magnifying step (c), said second directional information is first extracted and then magnified.

11. The method as claimed in claim 7, wherein during said extracting and magnifying step (c), said second directional information is first magnified and then extracted.

* * * * *